United States Patent [19]
Alidina et al.

[11] Patent Number: 5,991,785
[45] Date of Patent: Nov. 23, 1999

[54] DETERMINING AN EXTREMUM VALUE AND ITS INDEX IN AN ARRAY USING A DUAL-ACCUMULATION PROCESSOR

[75] Inventors: Mazhar M. Alidina; Sivanand Simanapalli, both of Allentown, Pa.

[73] Assignee: Lucent Technologies Inc., Murray Hill, N.J.

[21] Appl. No.: 08/969,252

[22] Filed: Nov. 13, 1997

[51] Int. Cl.⁶ .................................................... G06F 7/02
[52] U.S. Cl. ............................................ 708/207; 708/524
[58] Field of Search .................. 364/715.06, 736.02; 708/207, 524

[56] References Cited

U.S. PATENT DOCUMENTS

| | | | |
|---|---|---|---|
| 5,262,969 | 11/1993 | Ishihara | 364/715.06 |
| 5,515,306 | 5/1996 | Blaner et al. | 364/715.06 |
| 5,524,251 | 6/1996 | Urasaki | 364/715.06 |
| 5,721,809 | 2/1998 | Park | 364/715.06 |
| 5,726,923 | 3/1998 | Okumura et al. | 364/715.06 |
| 5,752,072 | 5/1998 | Agarwal | 364/715.06 |

*Primary Examiner*—David H. Malzahn
*Attorney, Agent, or Firm*—Darby & Darby

[57] ABSTRACT

A data processor determines an overall extremum value of an input set of array data, with the input set of array data partitionable into a first set of array data and a second set of array data. The data processor includes a pair of compare-select circuits implemented in an adder as well as in an arithmetic-logic unit (ALU), respectively, which operate in parallel for respectively processing the first set and the second set, and for respectively determining first and second extremum values of the first set and the second set, respectively. A first compare-select circuit of the pair of compare-select circuits determines the overall extremum value of the input set of array data from the first and second extremum values. The first compare-select circuit also determines the location of the overall extremum value in the input set of array data. The computational complexity in determining extrema is reduced by implementing compare-select features in an adder in addition to an ALU to operate in parallel to reduce the number of processing cycles.

16 Claims, 2 Drawing Sheets

DETERMINING AN EXTREMUM VALUE AND ITS INDEX IN AN ARRAY USING A DUAL-ACCUMULATION PROCESSOR

FIELD OF THE INVENTION

The present invention relates generally to the field of data processing, and in particular concerns the processing of arrays of data to determine extremum values.

BACKGROUND OF THE INVENTION

In many data processing applications using computer systems and integrated circuits, arrays of numbers representing data values are stored and manipulated, for example, in the memory of the computer system. For an array of N data values, extremum values (i.e. maxima or minima of the data values), if they exist, are characteristic parameters of the array. Data processing applications utilize such maxima and minima, as well as their respective locations in the array, indicated by an index or pointer to the data values corresponding to the maxima and/or minima.

Heretofore, the determination of maxima and minima in data processing applications, such as in Viterbi processing in equalization and speech processing, has been compute intensive.

One form of digital signal processor (DSP) architecture that exhibits significant benefits in processing speed is known as a Multiply-Accumulate or MAC processor. The MAC processor implements an architecture that takes advantage of the fact that the most common data processing operations involve multiplying two values, then adding the resulting value to another and accumulating the result. These basic operations are efficiently carried out utilizing specially configured, high-speed multipliers and accumulators, hence the "Multiply-Accumulate" nomenclature.

Another method for increasing processing speed is to perform different processes concurrently. Towards this end, DSP architectures with plural MAC structures have been developed. For example, a dual MAC processor is capable of performing two independent MAC operations concurrently.

The DSP16000 dual-MAC processor, available from Lucent Technologies, includes a data arithmetic unit (DAU), which constitutes the primary computational unit. The inputs to the multipliers of the DAU are applied through a pair of double length registers designated as the x and y registers, while the output of each multiplier is applied to a respective product register. Concurrent accumulations are achieved by providing both two-input arithmetic logic unit (ALU) and a three-input adder, either of which may accumulate the data in either product register. When mathematical functions are performed by the ALU or adder, the result is stored in an accumulator register, a number of which are present in the DAU.

Implementations of extrema determination typically use brute force number crunching procedures to accurately determine an extremum and its location in an array of data values. For example, the following pseudo code, which may be implemented in the DSP16000 assembly language, or alternatively in the Pascal or C++ computer languages, may be used to determine a minimum value in an array, ARRAY, of data values:

```
MIN_VALUE = MIN_INITIALIZED;
MIN_INDEX = 0;
FOR I = 1 TO N {
    IF ARRAY[I] < MIN_VALUE    {
        MIN_VALUE = ARRAY[I];
        MIN_INDEX = I;
                               }
}.
```

After processing each and every one of the N data values in the array, ARRAY, the above pseudo code stores the determined minimum in a parameter MIN_VALUE, and stores the location of the minimum in the parameter MIN_INDEX.

Previous implementations of such extrema determination procedures are compute intensive. For example, if the pseudo code listed above were implemented with the DSP16000 dual-MAC processor, the compare-select feature of the ALU would implement the comparison step "ARRAY[I]<MIN_VALUE" listed above. In such an embodiment, each pass through the FOR loop listed above is implemented in one processing cycle.

It is contemplated that the computational complexity in determining extrema may be reduced by implementing compare-select features in the adder of the DAU, in addition to implementation in the ALU, and that these two units operate in parallel to reduce the number of processing cycles.

A data processor determines an overall extremum value of an input set of array data, with the input set of array data partitionable into a first set of array data and a second set of array data. The data processor includes a pair of compare-select circuits, one implemented in an adder and the other in an arithmetic-logic unit (ALU), the two operate in parallel for concurrent processing of the first and second sets, and for determining respective extremum values for the first and second sets. One compare-select circuit of the pair of compare-select circuits determines the overall extremum value of the input set of array data from the first and second extremum values. The one compare-select circuit also determines the location of the overall extremum value in the input set of array data.

BRIEF DESCRIPTION OF THE DRAWINGS

The features and advantages of the disclosed data processor and method are readily apparent and are to be understood by referring to the following detailed description of the preferred embodiments of the present invention, taken in conjunction with the accompanying drawings, in which.

DESCRIPTION OF THE PREFERRED EMBODIMENTS

Figure 1:
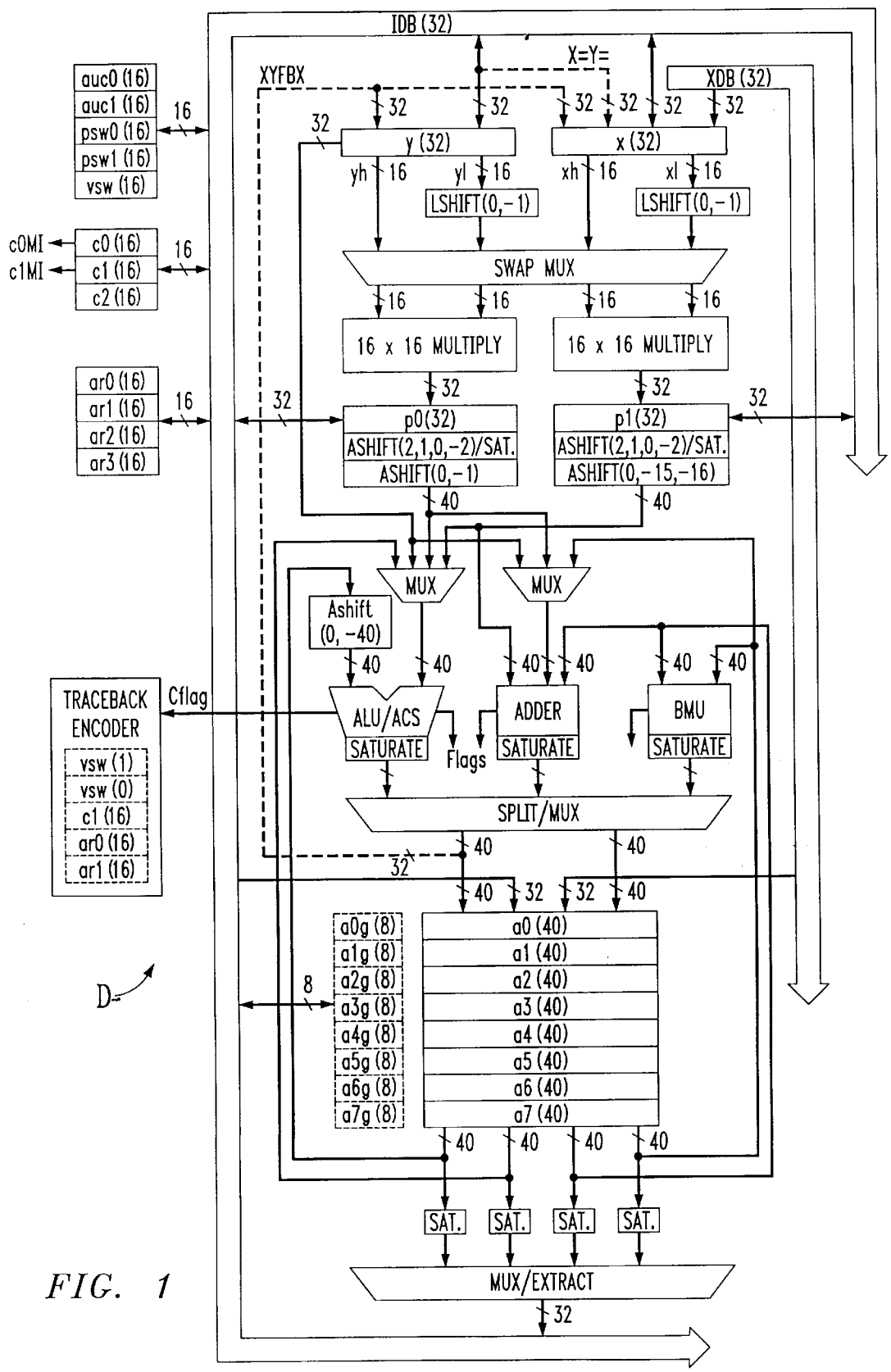
FIG. 1 is a schematic diagram illustrating relevant portions of the disclosed data processor.

Referring now to FIG. 1, the present invention may be implemented in a wide range of digital signal processing applications. Preferably the invention is incorporated in the DAU (data arithmetic unit), D, of a dual-MAC processor, such as the DSP16000 identified above.

The DAU includes two 32-bit registers, x(32) and y(32), that may be operated as four 16-bit registers yh, yl, xh and xl (e.g. "yl" represents the lower 16 bits of the y register and "yh" the upper 16 bits), providing the inputs to two signed 16-bit×16-bit multipliers. The multipliers produce respective 32-bit results stored in respective product registers p0(32) and p1(32). The product registers communicate with a 32-bit data bus IDB(32) that serves as the primary data path for the data arithmetic unit.

The data stored in the respective registers p0(32) and p1(32) may undergo arithmetic register shifts and are fed through multiplexers MUX to either a 40-bit arithmetic-logic-unit ALU with an add/compare/select feature ALU/ACS, a 40-bit manipulation unit BMU, or a 40-bit 3-input adder/subtractor ADDER, also with a compare/select feature. The arithmetic unit implements addition, subtraction, and various logical operations. The bit manipulation unit implements barrel-shifts, bit insertion and extraction, and normalization. As a complement to the arithmetic and bit manipulation units, the adder performs general addition and subtraction operations. Concurrent multiply and accumulation operations may be achieved by using the two multipliers, the ALU and the ADDER, and concurrent compare/selects can be achieved by using the ALU and the ADDER.

Respective saturator units SATURATE disposed at the outputs of the respective arithmetic, bit manipulation and adder units ALU, BMU and ADDER enable overflow saturation to modify the respective results. The overflow saturation feature also optionally affects accumulator values as the data is transferred to memory or to one or more registers. This feature accommodates various speech coding standards such as Global System Modulation, or GSM, vocoders at full, half and enhanced full rates. Moreover, shifting in the arithmetic pipeline occurs at several stages to accommodate various standards for extended-precision multiplications.

The modified results from the respective saturators SATURATE are then fed through a split multiplexer SPLIT/MUX to a register array comprising eight 40-bit accumulators a0 through a7, each including a high part and a low part.

The data arithmetic unit DAU also conveniently includes a plurality of 16-bit, bus-accessible control registers including counters c0–c2, arithmetic unit control registers auc0 and auc1, processor status words psw0 and psw1, auxiliary registers ar0–ar3, and a Viterbi support word vsw.

Figure 2:
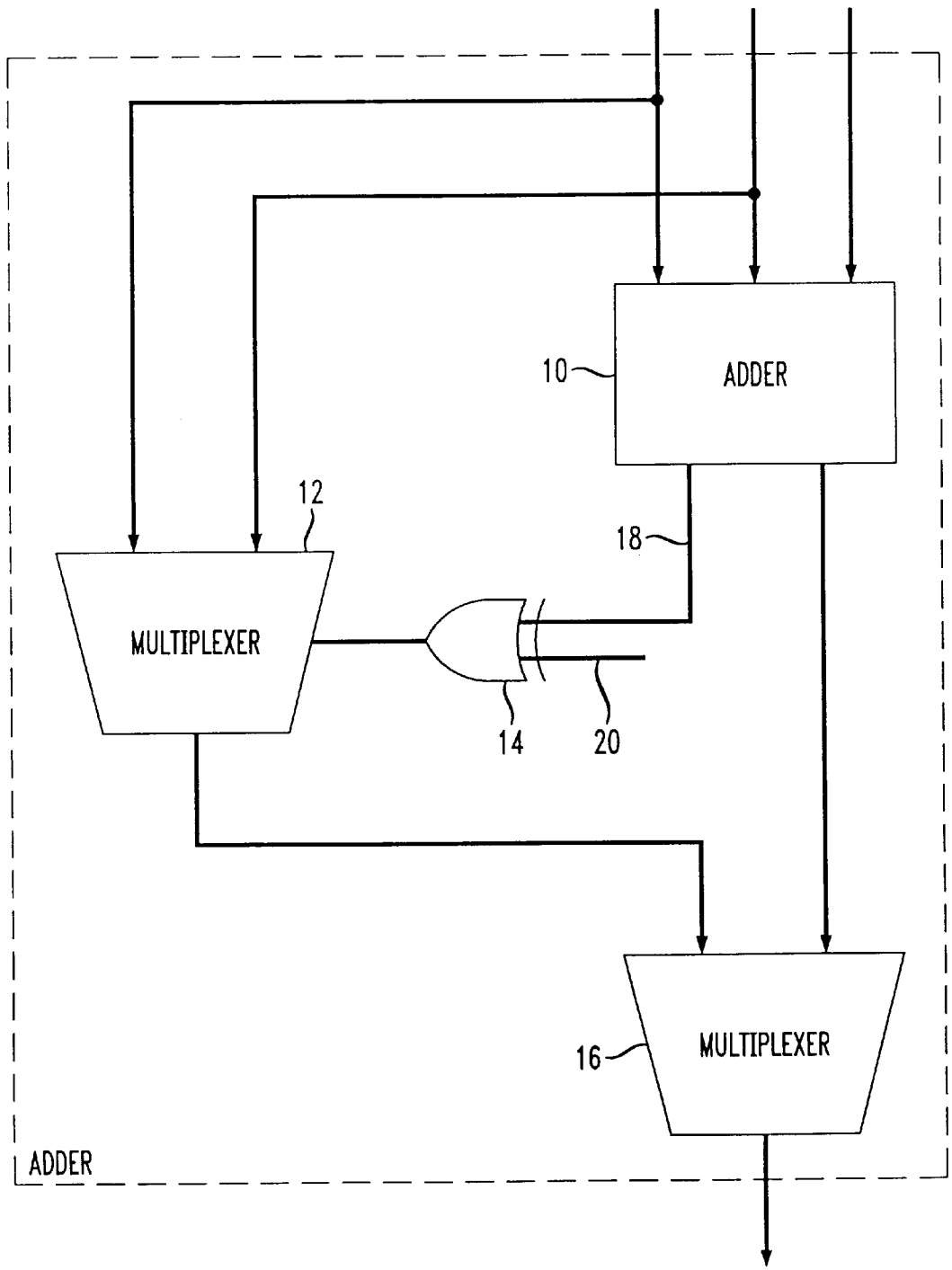
FIG. 2 is a schematic diagram illustrating an adder of the disclosed data processor configured with multiplexers.

FIG. 2 is a simplified logic block diagram illustrating how a conventional adder may be modified to provide the compare/select function in ADDER of FIG. 1. The compare/select function may be similarly provided in ALU/ACS in FIG. 1.

Adder 10 is a conventional three input adder which may provide sums and differences. It may also perform accumulate operations in conjunction with the multipliers in FIG. 1. The two left-hand inputs to the adder 10 are also provided as inputs to a multiplexer 12, which is controlled through an EXCLUSIVE-OR gate 14. The output of multiplexer 12 is also provided as an input to a multiplexer 16, along with the normal 40 bit output of the adder 10. Through control bits, not shown, this allows selective operation in a normal adder mode or in an accumulate/select mode. Inasmuch as only the accumulate/select mode is of interest, only components associated with that mode are shown.

In operation, only the left two inputs of adder 10 would be used for compare/select operation. The sign bit of adder 10 is applied via lead 18 and through EXCLUSIVE-OR gate 14 to control which of the inputs to multiplexer 12 is applied to its output. A logical 0 at the output of gate 14 causes one of the inputs to be transmitted, while a logical one causes the other to be transmitted. The sign bit on lead 18 will be either a logical 0 or logical 1, representing a negative or positive sign, respectively. The other input to gate 14 is a mode bit applied via lead 20. The mode bit on lead 20 will have the effect of causing the sign bit to be transmitted through gate 14 in either non-inverted or inverted form, depending on whether the mode bit has a logical 0 or logical 1 value, respectively.

By convention, ADDER has been designed so that multiplexer 12 will transmit the input with lower value when the sign output bit on adder 10 has a logical 0 value. Thus, when the mode bit has a logical 0 value, it will act to transmit the lesser of its two inputs to the output of multiplexer 16. On the other hand, when the mode bit has a logical 1 value, the operation is inverted, and ADDER will transmit the larger of the two inputs to the output of multiplexer 16. Hence, through the use of the mode bit, it is possible to control whether ADDER will act to detect the lesser or the greater of the two inputs to multiplexer 12.

The mode bit which controls gate 14 (and the compare/selection function of ALU/ACS of FIG. 1) is preferably a pre-defined bit position in register vsw(16).

The present invention involves a data processor and method for processing array data stored, for example, in memory, to determine extremum values in the array data as well as the location of such extremum values in the array data. In an illustrative embodiment, the data processor determines a minimum value MIN_VALUE and a location value MIN_INDEX. It is understood that, as described below, the data processor may be adapted to determine a maximum value and a location value of the maximum value in the array data in addition to or instead of the minimum value and its location in the array data.

By implementing concurrent compare-select features in the adder 10 in addition to the ALU, two passes of the conventional FOR loop described above may be effectively accomplished in one processing cycle. This substantially reduces the number of processing cycles required to determine the extrema and the location thereof in the array of N data values. Implementing concurrent compare-select features in the adder 10 and the ALU provides an improved architectural efficiency over prior art processors using adders without such compare-select features.

In performing the method of the invention, the various registers, parameters, pointers and the counter c1 are first initialized. For example, counter c1 would have the value "1" stored in it initially and accumulators a2 and a3 would be loaded with an initial minimum value, such as the first data value in the array, ARRAY[1] and the second array value ARRAY[2], respectively. This is accomplished by the instruction:

a2_3h=*r0++.

This is an indirect data transfer, whereby the upper halves of a2 and a3 are concatenated into a single 32 bit vector or pseudo register, which is then loaded with the contents of the 32 bits of memory starting at the location identified by the pointer r0, after which the pointer contents are incremented twice (the data are represented as 16 bit words, so the pointer must be advanced by two words). The accumulators a0 and a1 may similarly be loaded to have as initial values the next two data in the array, ARRAY[3] and ARRAY[4], respectively, by the instruction:

a0_1h=*r0++.

The method processes the data of the array in pairs, concurrently comparing each datum of the pair to a corresponding running extremum (e.g. minimum), substituting the datum for the corresponding running extremum if it is more extreme. This processing continues iteratively in consecutive processor cycles, until all data have been processed. When a substitution for the running extremum occurs, the location of the corresponding datum in the array is stored. After all data has been processed, the two running extrema are compared and the more extreme is selected as the extremum of the array, and its location is selected as the location of the extremum.

In terms of code, the process would perform the following steps in a loop for values of i from 3 to N/2:

a2=cmp0(a2,a0) a3=cmp0(a3,a1) a0_1h=*r0++ where N is the number of data in the array. During each iteration through the loop the c1 is incremented. In the above code "cmp0( )" is the compare-select function. As explained above, the selection made by the function is determined by the value of a mode bit, which is a predefined bit in the vsw(16) register, called the MAX bit. When the MAX bit is a logical 0 the cmp0 function selects the minimum, and when the bit is a logical one, it selects the maximum. Thus, the same code can be used to compute maxima or minima, by simply changing the value of the mode bit MAX.

In the above line of code, the first expression determines whether the datum in a0 is more extreme than the corresponding running extremum in a2, storing the selected value in a2; and the second expression determines whether the datum in a1 is more extreme than the corresponding running extremum in a3, storing the selected value in a3. The third expression updates the contents of a0 and a1, and advances the pointer r0, as already explained.

The sign bits from adder 10 and the ALU are indicative of when the data value is more extreme than the corresponding running extremum. These sign bits are extracted as flags, which cause the transfer of the count of c1 (equal to the value of i) to registers ar1 and ar2, respectively. Thus, ar1 and ar2 store the count that existed when the corresponding running extremum occurred. This is related directly to the location of the running extremum in the data array, as will be discussed more fully below.

From the description up to this point, it will be appreciated that each iteration of the above line of code (one processor cycle) results in a pair of running extrema and data related to their location in the array being stored in ar1 and ar2. After all data in the array have been processed, the following line of code can be used to extract the overall extremum of the array from the running extrema:

a2=cmp0(a2,a3).

This results in the overall extremum being stored in a2. Also, the sign flag derived from the compare-select indicates whether the overall extremum was the value in a2 or a3. The value of this flag causes one of the following two computations to be made for the location, of the overall extremum in the array of data, depending on which register had the overall extremum:

for a2: (ar1<<1)−1
for a3: ar2<<1 where the symbol "<<1" represents a one bit left shift of the contents of the register preceding the symbol.

Accordingly, by increasing the hardware complexity of the adder 10 and the ALU to cause the registers ar1 and ar2 to store indices, and also by allocating sufficient instruction encoding space for the operations of the comparison-selection functions of the adder 10 and the ALU, the data processor operates more efficiently and rapidly than the prior art and processes array data with a reduced number of processing cycles.

While the disclosed data processor and method are particularly shown and described herein with reference to the preferred embodiments, it is to be understood that various modifications in form and detail may be made without departing from the scope and spirit of the present invention. Accordingly, modifications such as any examples suggested herein, but not limited thereto, are to be considered within the scope of the present invention.

What is claimed is:

1. In a data processor, apparatus for determining an overall extremum value of a set of array data, the apparatus comprising:

first and second compare-select circuits operating in parallel, the first compare-select circuit for processing a first data set to determine a first extremum value and the second compare-select circuit for processing a second data set to determine a second extremum value, the first and second data sets together constituting the set of array data;

the first or second compare-select circuits determining the overall extremum value between the first and second extremum values and storing the location of the overall extremum value in the set of array data; and a first register derived from a counter storing the location of the extremum value for the first data set and a second register derived from the counter storing the location of the extremum value for the second data set, one of the first or second registers, depending on whether the extremum value is in the first or second data set, being manipulated by one or more operations using constant values in order to determine the overall extremum index.

2. The apparatus of claim 1, wherein the pair of compare-select circuits determines first and second minimum values of the first and second sets, respectively, as the first and second extremum values, respectively.

3. The apparatus of claim 1, wherein the pair of compare-select circuits determines first and second maximum values of the first and second sets, respectively, as the first and second extremum values, respectively.

4. The apparatus of claim 1, wherein one of the compare-select circuits is incorporated in an adder and the other compare-select circuit is incorporated in an arithmetic-logic unit.

5. The apparatus of claim 1, wherein each of the pair of compare-select circuits is responsive to a mode signal to determine whether the extremum values are maxima or minima.

6. The apparatus of claim 1, further comprising:

storage means responsive to the compare-select circuits to store the location of an extremum value in the array data.

7. The apparatus of claim 6, wherein the compare-select circuits further comprise:

flag generating means, responsive to the compare-select circuits determining the first and second extremum values in one clock cycle, to generate a flag which latches the storage of the location of the extremum value.

8. The apparatus of claim 1, wherein if the first data set contains the overall extremum value, the first register is manipulated by left shift one and subtract one and if the second data set contains the overall extremum value, the second register is manipulated by left shift by one.

9. A plural multiply-accumulate (plural-MAC) processor for determining an overall extremum value of an input set of array data, comprising:

an adder having a first compare-select circuit; and an arithmetic-logic unit (ALU) having a second compare-select circuit;

the first compare-select circuit processing a first set of data to determine a first extremum value and the second compare-select circuit processing a second set of data to determine a second extremum value, the first and second compare-select circuits processing concurrently, and the first and second sets of data together constituting the set of array data;

the first or second compare-select circuits determining the overall extremum value of the input set of array data as the extremum value between the first and second extremum values; and a first register derived from a counter storing the location of the extremum value for the first data set and a second register derived from the counter storing the location of the extremum value for the second data set, one of the first or second registers, depending on whether the extremum value is in the first or second data set, being manipulated by one or more operations using constant values in order to determine the overall extremum index.

10. The plural-MAC processor of claim 9, wherein the extremum values determined by the compare-select circuits are minimum values.

11. The plural-MAC processor of claim 9, wherein the extremum values determined by the compare-select circuits are maximum values.

12. The plural-MAC processor of claim 9, wherein each of the pair of compare-select circuits is responsive to a mode signal to determine whether the extremum values are maxima or minima.

13. The plural-MAC processor of claim 9, further comprising:

storage means responsive to the compare-select circuits to store a location of an extremum value in the array data.

14. The plural-MAC processor of claim 13, wherein the compare-select circuits further comprise:

flag generating means, responsive to the compare-select circuits determining the first and second extremum values in one clock cycle, to generate a flag which latches the storage of the location of the extremum value.

15. A method for determining an overall extremum value of an input set of array data in a data processor operating in consecutive processing cycles, the method comprising the steps of:

a. initializing first and second extremum values and selecting datum to form a pair of data to be processed from the array;

b. performing concurrent compare-select operations between one of the pair of data and the first extremum value and between the other of the pair of data and the second extremum value to produce new first and second extremum values equal to the resulting extremes; and c. in the same processing cycle as step b, selecting an unprocessed pair of data from the array and returning to step b, unless no unprocessed data remain;

c1. in the same processing cycle each time step b is performed, storing the location of a newly selected extremum value of the array data;

d. determining the overall extremum value of the input set of array data as the extremum between the first and second extremum values; and e. determining the overall extremum index by manipulating a register derived from a counter corresponding to the location of the overall extremum value depending on whether the overall extremum value is in the first or second set, said manipulating step being left shift by one and subtract one if the overall extremum value is in the first set and left shift by one if the overall extremum value is in the second set.

16. The method of claim 15, wherein the step c1 further comprises:

in the same processing cycle each time step b is performed, upon selecting a new value for the first or second extremum values, generating a flag which causes storage in a predefined memory area of the location of the corresponding extremum value in the array data.

* * * * *